(12) United States Patent
Wei

(10) Patent No.: US 12,172,386 B2
(45) Date of Patent: Dec. 24, 2024

(54) METHOD FOR MANUFACTURING PAD WITH DYNAMIC MASSAGE BUBBLES

(71) Applicant: Zhaoming Wei, Dongguan (CN)

(72) Inventor: Zhaoming Wei, Dongguan (CN)

( * ) Notice: Subject to any disclaimer, the term of this patent is extended or adjusted under 35 U.S.C. 154(b) by 153 days.

(21) Appl. No.: 18/079,888

(22) Filed: Dec. 13, 2022

(65) Prior Publication Data

US 2023/0182402 A1  Jun. 15, 2023

(30) Foreign Application Priority Data

Dec. 13, 2021 (CN) .......................... 202111517031.0

(51) Int. Cl.
  *B29C 65/00* (2006.01)
  *B29C 65/70* (2006.01)
  *B29L 31/50* (2006.01)

(52) U.S. Cl.
  CPC .............. *B29C 66/43* (2013.01); *B29C 65/70* (2013.01); *B29C 66/727* (2013.01); *B29L 2031/507* (2013.01)

(58) Field of Classification Search
  CPC ....... A43B 17/03; B32B 3/26; B29C 44/1266; B29C 44/12; Y10T 156/103
  See application file for complete search history.

(56) References Cited

U.S. PATENT DOCUMENTS 5,036,603 A * 8/1991 Dischler ................ A43B 17/00
  36/43
2009/0100705 A1* 4/2009 Cook ..................... A43B 13/12
  36/28

\* cited by examiner

*Primary Examiner* — Christopher T Schatz
(74) *Attorney, Agent, or Firm* — Leong C. Lei

(57) ABSTRACT

A method for manufacturing a pad with dynamic massage bubbles includes: preparing an upper-half foam substrate and a lower-half foam substrate; and bonding the upper-half foam substrate and the lower-half foam substrate together by means of hot press so that air bubbles are formed therebetween. Particularly, then form-setting bake is performed under a progressively decreased baking temperature, so that as the pad is cooled gradually, the air bubbles are well shaped. The method provides improved dimensional control of air bubbles, thereby significantly enhancing manufacturing precision and yield.

11 Claims, 7 Drawing Sheets

METHOD FOR MANUFACTURING PAD WITH DYNAMIC MASSAGE BUBBLES

BACKGROUND OF THE INVENTION

1. Technical Field

The present invention relates to manufacturing of buffer pads, and more particularly to a method for manufacturing a pad with dynamic massage bubbles.

2. Description of Related Art

Foam materials are extensively used in various sectors such as electronics, home appliances, automobiles, recreation & sports, and shoes. For example, China Patent Publication No. CN 205757571 U discloses a damping insole that comprises an insole body and an airbag component that has a front airbag, a back airbag, and an air channel communicating the front and back airbags. The insole body is configured to contact a human sole at its upper surface and has its lower surface formed with a sink shaped to fittingly receive the front airbag, the air channel, and the back airbag. During manufacturing, two pieces of plastic film are stacked vertically and sealed peripherally to form an airbag component. The periphery of the sealed plastic film thereby forms a connecting portion to be adhered to the lower part of the insole body through glue.

However, the known structure demonstrates some defects in practical use. First, the airbag component is adhered outside the insole body from below, so the bulges of the airbags are less perceivable to the user standing on the insole. Secondary, the airbag component made of plastic film is to be located between the bottom of the insole body and a shoe sole, and once the shoe insole moves with respect to the shoe sole, which is unavoidable, rub between the insole body and the shoe sole can wear and eventually damage the airbag component, leading to degraded or even totally failed damping effects. Besides, in manufacturing of the existing insole, the shoe insole and the airbag component, which each have a special structure, have to be made separately and then assembled together, making the process complicated and uneconomic.

Hence, there is indeed a need for a novel technical scheme that address the shortcomings of the prior art.

SUMMARY OF THE INVENTION

In view of the shortcomings of the prior art, the primary objective of the present invention is to provide a method for manufacturing a pad with dynamic massage bubbles, wherein when an upper-half foam substrate and a lower-half foam substrate are bonded together by means of hot press so that air bubbles are formed therebetween. Particularly, then form-setting bake is performed under a progressively decreased baking temperature, so that as the pad is cooled gradually, the air bubbles are well shaped. The method provides improved dimensional control of air bubbles, thereby significantly enhancing manufacturing precision and yield.

To achieve the foregoing objective, the present invention adopts the following technical schemes:

a method for manufacturing a pad with dynamic massage bubbles comprising the following steps:

Step 1: preparing an upper-half foam substrate and a lower-half foam substrate to be stacked vertically;

Step 2: intercalating a separating portion between the upper-half foam substrate and the lower-half foam substrate that are aligned vertically, wherein the separating portion includes two or more separately located bubble-forming segments and an air passage segment connected between the adjacent bubble-forming segments, in which the air passage segment has a width smaller than a width of each of the bubble-forming segments;

Step 3: stacking the upper-half foam substrate and the lower-half foam substrate after arrangements of Step 2 vertically in a mold for hot press bonding, wherein during the hot press bonding, the upper-half foam substrate and the lower-half foam substrate are not bonded at any part thereof where the separating portion is present, and air existing between the upper-half foam substrate and the lower-half foam substrate without the separating portion is forced into the separating portion, until the upper-half foam substrate and the lower-half foam substrate are bonded wherever the separating portion is absent, and the separating portion containing the air inflates under heat, so that between the upper-half foam substrate and the lower-half foam substrate, air bubbles form at least in the bubble-forming segments to cause an upper surface of the upper-half foam substrate and a lower surface of the lower-half foam substrate to bulge outward as the massage bubbles corresponding to the air bubbles, and the air passage segment forms an air passage, thereby obtaining a pad intermediate;

Step 4: transmitting the pad intermediate obtained in Step 3 to an oven for form-setting bake under a progressively decreased baking temperature, wherein as the pad intermediate is baked to shrink in terms of size, an area where the air bubbles are present reduces correspondingly, so that an air pressure in each of the air bubbles increases; and an initial value of the baking temperature in the oven is lower than a temperature for the hot press bonding in the mold;

Step 5: removing a resulting pad product from the oven.

The present invention is superior to the prior art with its advantages and beneficial effects. Specifically, with the technical schemes described previously, the present invention bonds the upper-half foam substrate and the lower-half foam substrate together by means of hot press so that air bubbles are formed therebetween. Particularly, then form-setting bake is performed under a progressively decreased baking temperature, so that as the pad is cooled and shrinks gradually, an area where the air bubbles are present reduces correspondingly, so that the air pressure in each of the air bubbles increases to fully plump the air bubbles. Consequently, bulges corresponding to the air bubbles can be better formed at the upper surface of the upper-half foam substrate and the lower surface of the lower-half foam substrate. In this way, the entire pad, and particularly the air bubbles, can be well shaped. The method provides improved dimensional control of air bubbles, thereby significantly enhancing manufacturing precision and yield.

The method is simple and practical. When some of the air bubbles are pressed, the air in these bubbles is forced into the adjacent air bubbles through the air passages, making the adjacent air bubbles further bulge, thereby providing dynamic massage to the user.

DETAILED DESCRIPTION OF THE INVENTION

Figure 1:
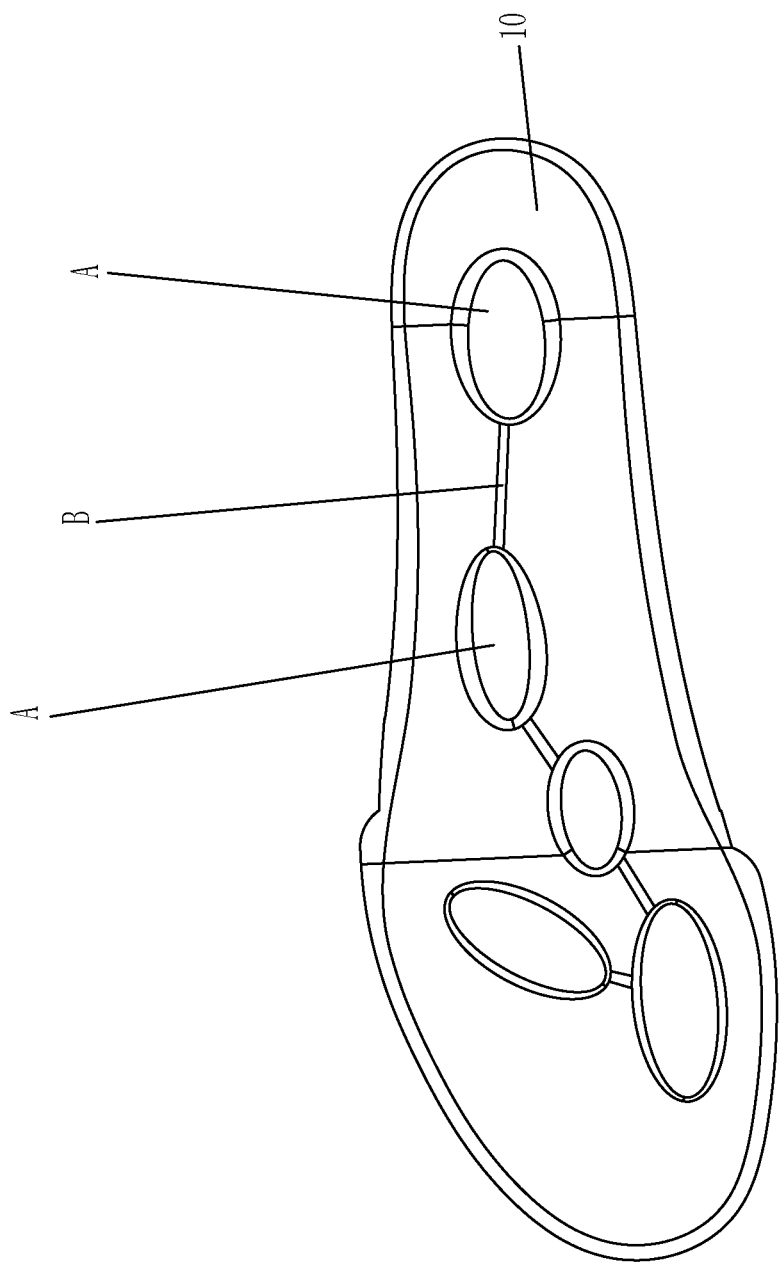
FIG. 1 is a schematic structural drawing of a shoe insole according to Embodiment 1 of the present invention.
Figure 2:
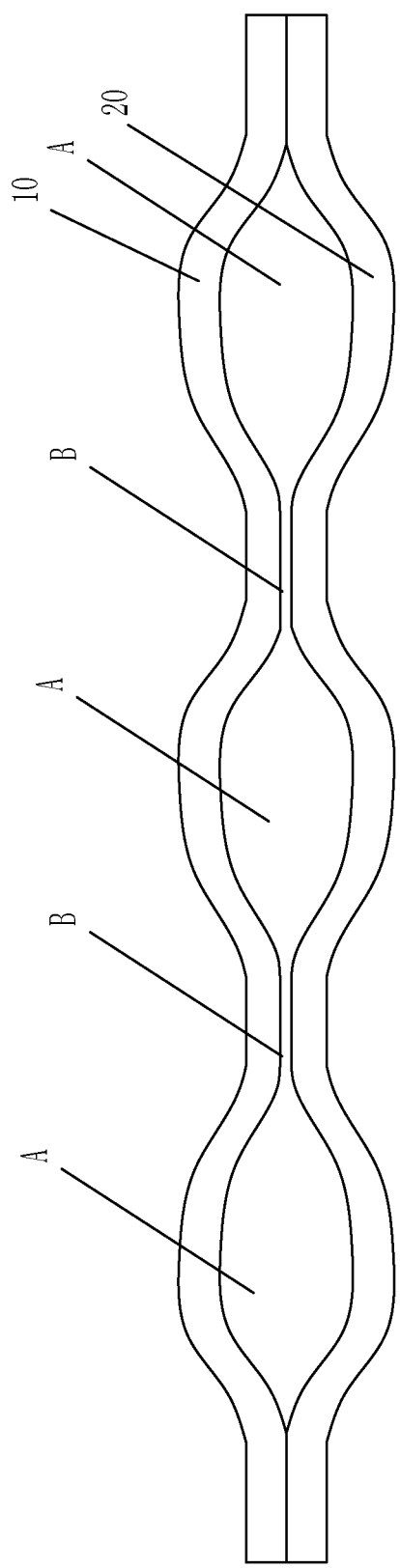
FIG. 2 is a partial, cross-sectional view of the shoe insole of Embodiment 1 of the present invention.
Figure 3:
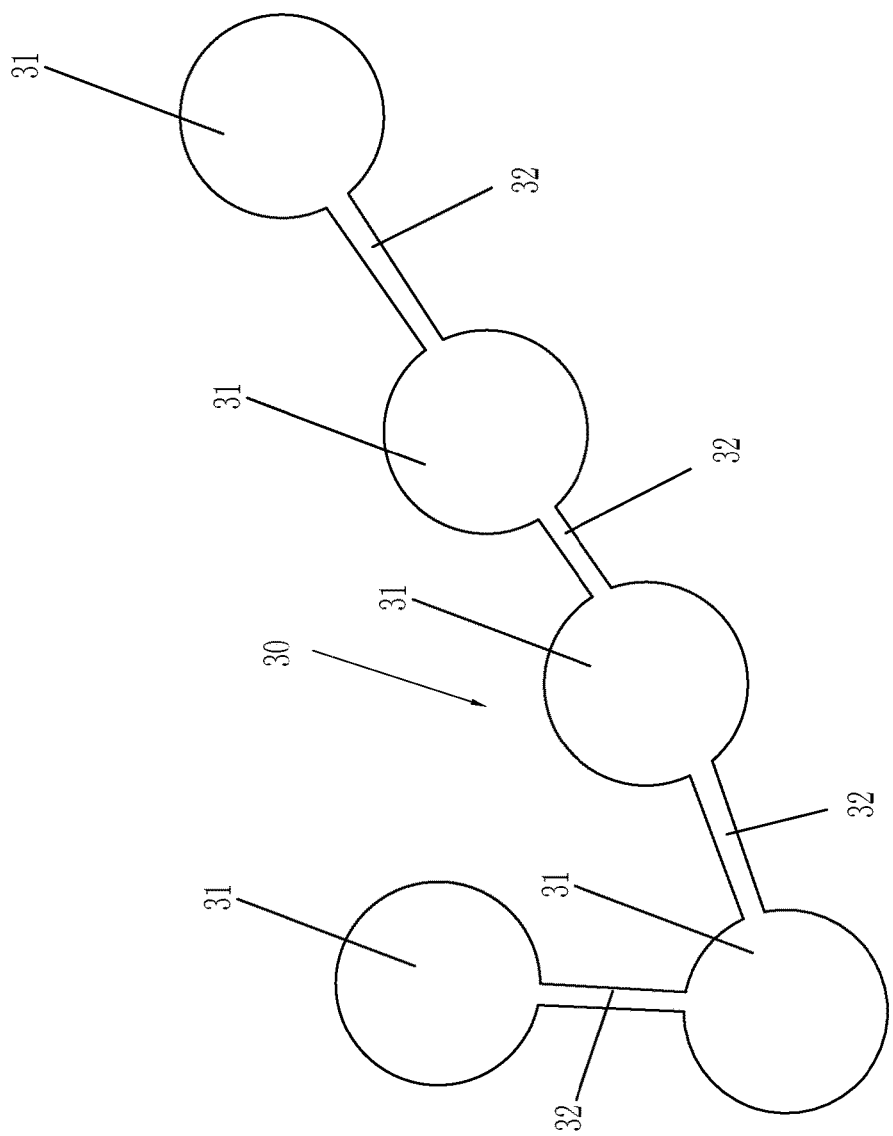
FIG. 3 shows an arrangement of a separating portion (in the form of a metal sheet or a plastic sheet or a silicone sheet) of the shoe insole of Embodiment 1 of the present invention.

Some embodiments of the present invention will be detailed below with reference to FIG. 1 through FIG. 7.

In one embodiment of the present invention, a method for manufacturing a pad with dynamic massage bubbles comprises the following steps.

At Step 1, an upper-half foam substrate 10 and a lower-half foam substrate 20 to be stacked vertically are prepared. Preferably, the upper-half foam substrate 10 and the lower-half foam substrate 20 are both made of EVA (Ethylene-vinyl acetate).

At Step 2, a separating portion 30 is intercalated between the upper-half foam substrate 10 and the lower-half foam substrate 20 that are aligned vertically to each other. The separating portion 30 is printing ink applied to one or both facing surfaces of the aligned upper-half and lower-half foam substrates 10, 20. The printing ink is not blendable with either the upper-half foam substrate 10 or the lower-half foam substrate 20. Alternatively, the separating portion 30 is a metal sheet arranged at one or both facing surfaces of the aligned upper-half and lower-half foam substrates 10, 20. Further alternatively, the separating portion 30 is a plastic sheet or a silicone sheet arranged at one or both facing surfaces of the aligned upper-half and lower-half foam substrates 10, 20.

The separating portion 30 includes two or more separately located bubble-forming segments 31 and an air passage segment 32 connected between the adjacent bubble-forming segments 31. The air passage segment 32 has a width smaller than a width of each of the bubble-forming segments 31.

At Step 3, the upper-half foam substrate 10 and the lower-half foam substrate 20 after the arrangements of Step 2 are stacked vertically in a mold for hot press bonding. During the hot press bonding, the upper-half foam substrate 10 and the lower-half foam substrate 20 are not bonded at any part thereof where the separating portion 30 is present, and air existing between the upper-half foam substrate 10 and the lower-half foam substrate 20 without the separating portion 30 is forced into the separating portion 30, until the upper-half foam substrate 10 and the lower-half foam substrate 20 are bonded wherever the separating portion 30 is absent, and the separating portion 30 containing the air inflates under heat, so that between the upper-half foam substrate 10 and the lower-half foam substrate 20, air bubbles A form at least in the bubble-forming segments 31 to cause the upper surface of the upper-half foam substrate 10 and the lower surface of the lower-half foam substrate 20 to bulge outward as the massage bubbles corresponding to the air bubbles A, and the air passage segment 32 forms an air passage B, thereby obtaining a pad intermediate.

At Step 4, the pad intermediate obtained in Step 3 is transmitted to an oven for form-setting bake at a progressively decreased baking temperature. As the pad intermediate is baked to shrink in terms of size, an area where the air bubbles are present reduces correspondingly, so that an air pressure in each of the air bubbles increases. An initial value of the baking temperature in the oven is lower than a temperature for the hot press bonding in the mold. The temperature for the hot press bonding in the mold is 130 degrees Celsius or higher, and a final, minimum value of the baking temperature in the oven is below 60 degrees Celsius. Herein, the progressively decreased baking temperature for the form-setting bake includes two or more descending temperature values. For example, the baking temperature is held at Temperature T1 for the baking time period t1, at Temperature T2 for the baking time period t2, at Temperature T3 for the baking time period t3, and at Temperature T4 for the baking time period t4. The initial temperature T1 is smaller than the temperature for hot press bonding in the mold. The final, minimal temperature Tn (i.e., T4 in this case) is higher than the ambient temperature or the temperature at the room for storing the final product. The final, minimum value of the baking temperature in the oven may be, for example, 45 degrees Celsius. To perform the form-setting bake at the progressively decreased baking temperature, the oven may have a single baking space configured with different, progressively decreased, heating temperatures for different baking stages, or it may have multiple baking spaces each have different temperature settings so that the intermediates can stay in an upstream baking space for a preset duration before entering a next, downstream baking space and so on.

Figure 4:
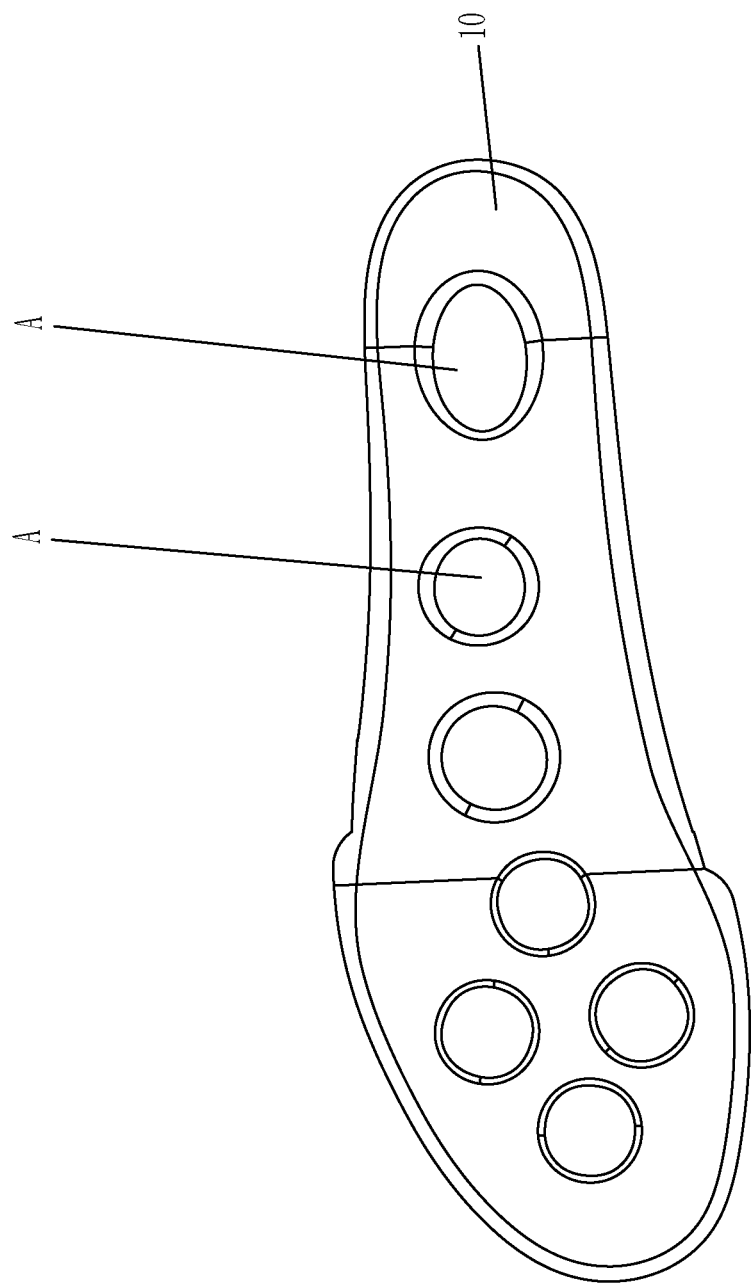
FIG. 4 is a perspective view of a shoe insole according to Embodiment 2 of the present invention (the air passage not shown)
Figure 5:
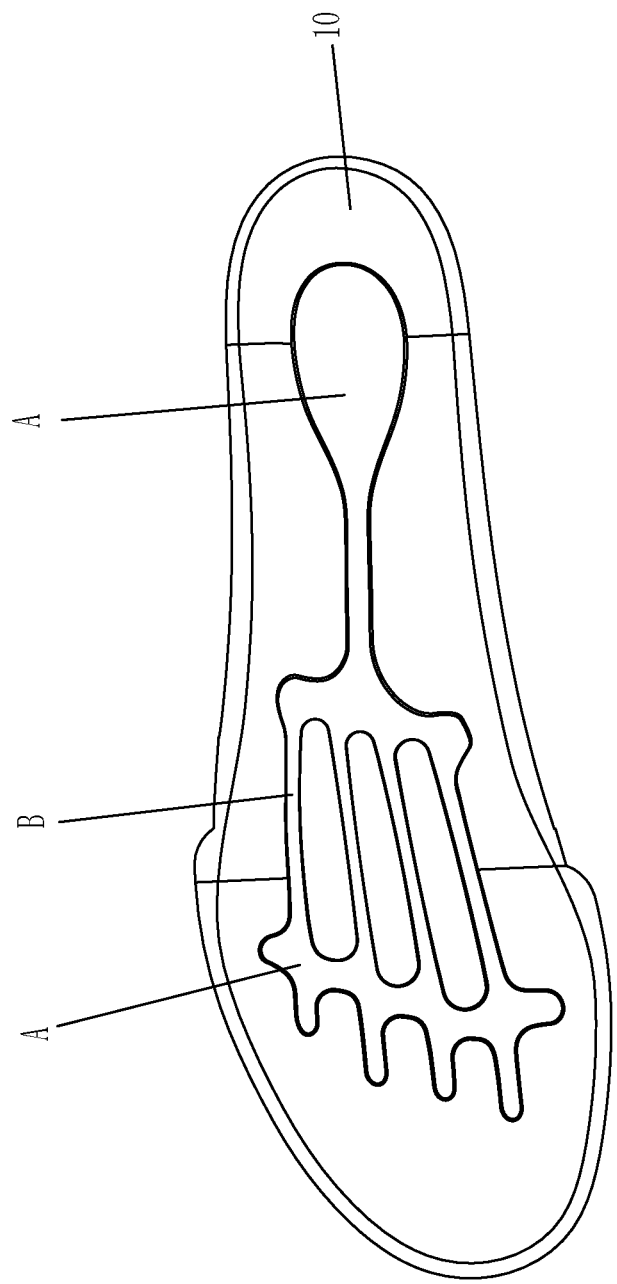
FIG. 5 is a schematic structural drawing of a shoe insole according to Embodiment 3 of the present invention.
Figure 6:
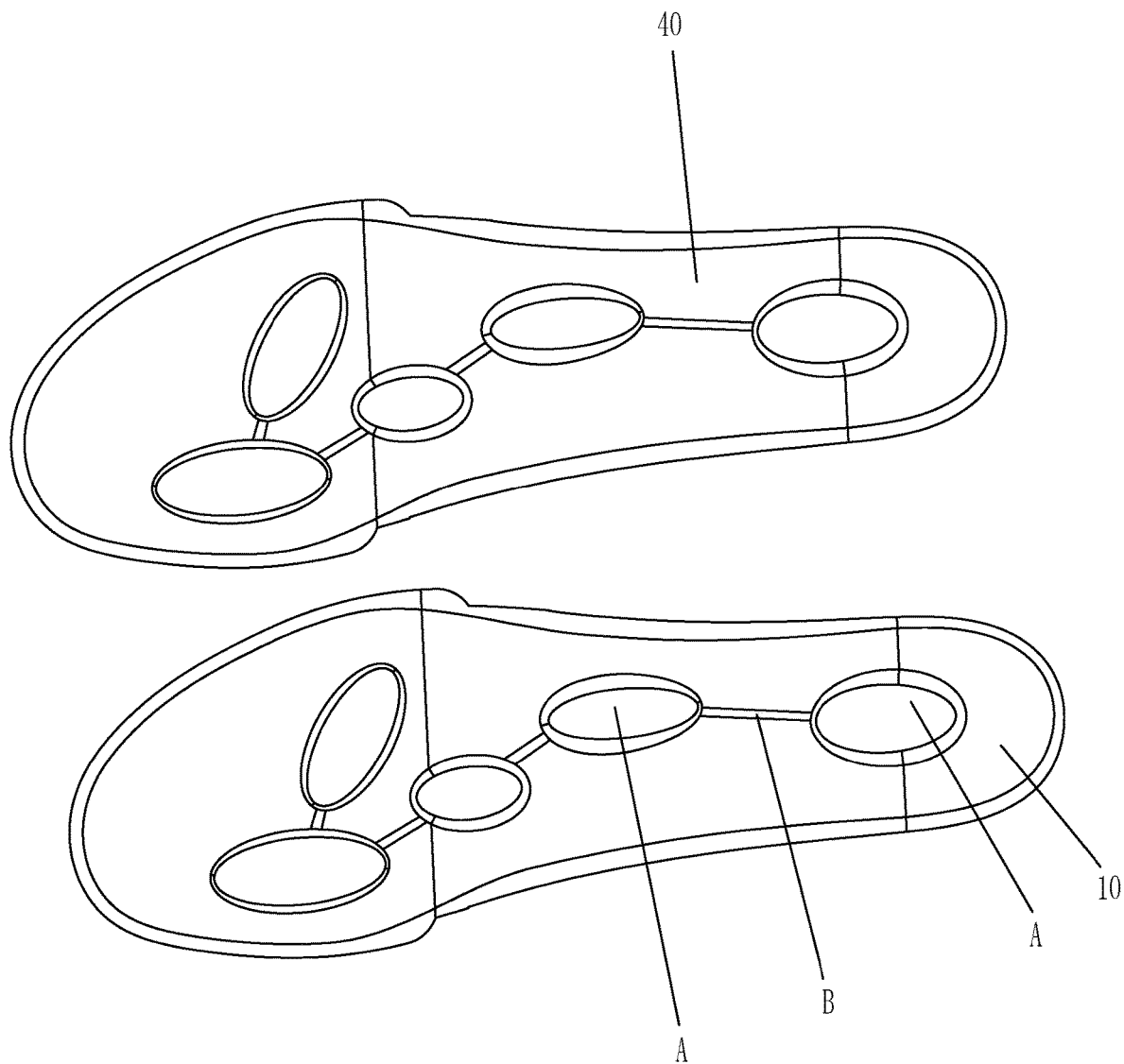
FIG. 6 is an exploded view of a shoe insole according to Embodiment 4 of the present invention.
Figure 7:
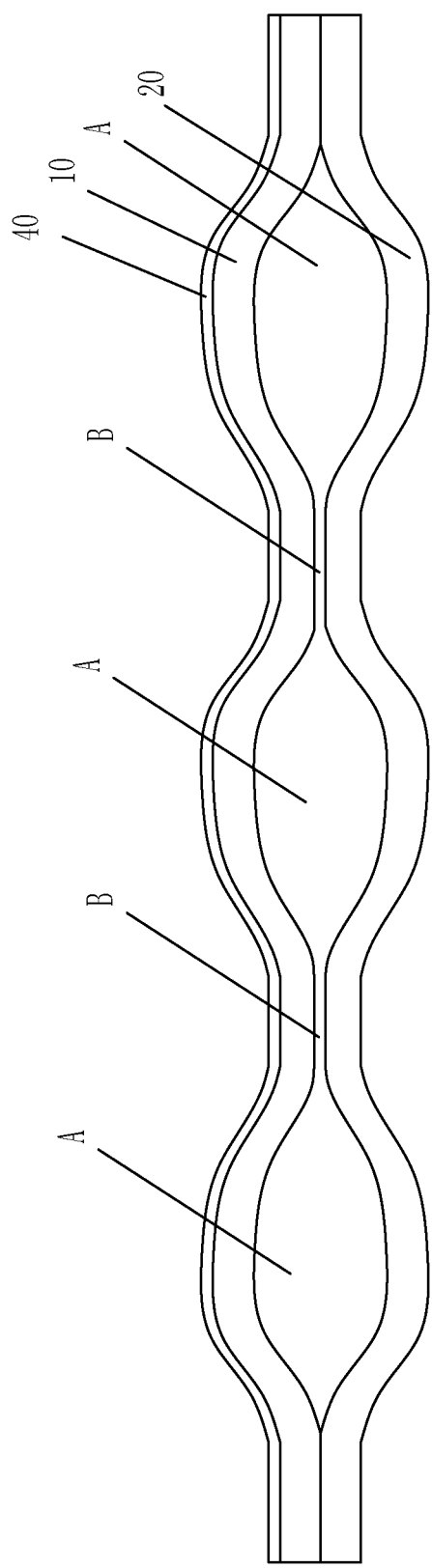
FIG. 7 is a partial, cross-sectional view of the shoe insole of Embodiment 4 of the present invention.

Step 5: removing a resulting pad product from the oven. The resulting pad has a Shore A hardness of 20-60. The pad may be a shoe insole, a seat cushion, or a back cushion.

Where the pad is a shoe insole, the upper surface of the shoe insole may be further provided with a cloth layer 40 or a leather layer as a soft, moisture-absorbing layer. The cloth layer 40 or leather layer is adhered to the upper surface of the upper-half foam substrate 10 after Step 5, and may be made of a material that has a certain level of deformability, so that the cloth layer 40 or the leather layer can closely fit on the outline of the upper surface of the upper-half foam substrate 10 after Step 5, thereby improving contact between the shoe insole and the human sole. For practical design and manufacturing, the air bubbles may be distributed to correspond to locations of two or more acupuncture points on an average human sole, as shown in FIG. 1, FIG. 4, and FIG. 5.

What is claimed is:

1. A method for manufacturing a pad with dynamic massage bubbles, comprising steps of:

Step 1: preparing an upper-half foam substrate and a lower-half foam substrate to be stacked vertically;

Step 2: intercalating a separating portion between the upper-half foam substrate and the lower-half foam substrate that are aligned vertically, wherein the separating portion includes two or more separately located bubble-forming segments and an air passage segment connected between the adjacent bubble-forming segments, in which the air passage segment has a width smaller than a width of each of the bubble-forming segments;

Step 3: stacking the upper-half foam substrate and the lower-half foam substrate after performing Step 2 vertically in a mold for hot press bonding, wherein during the hot press bonding, the upper-half foam substrate and the lower-half foam substrate are not bonded at any part thereof where the separating portion is present, and air existing in space between the upper-half foam substrate and the lower-half foam substrate absent the separating portion is forced into the separating portion, until the upper-half foam substrate and the lower-half foam substrate are bonded wherever the separating portion is absent, and the separating portion containing the air inflates under heat, so that between the upper-half foam substrate and the lower-half foam substrate, air bubbles form at least in the bubble-forming segments to cause an upper surface of the upper-half foam substrate and a lower surface of the lower-half foam substrate to bulge outward so that the massage bubbles are formed from the air bubbles, and the air passage segment forms an air passage, thereby obtaining a pad intermediate;

Step 4: transmitting the pad intermediate obtained in Step 3 to an oven for form-setting bake under a progressively decreasing baking temperature, wherein as the pad intermediate is baked to shrink, a volume where the air bubbles are present reduces, so that an air pressure in each of the air bubbles increases;

and an initial value of the baking temperature in the oven is lower than a temperature for the hot press bonding in the mold;

Step 5: removing a resulting pad product from the oven.

2. The method of claim 1, wherein the temperature for the hot press bonding in the mold is 130 degrees Celsius or higher, and a final, minimum value of the baking temperature in the oven is below 60 degrees Celsius.

3. The method of claim 2, wherein the final, minimum value of the baking temperature in the oven is 45 degrees Celsius.

4. The method of claim 1, wherein the separating portion is printing ink applied to one or both facing surfaces of the aligned upper-half and lower-half foam substrates, wherein the printing ink is not blendable with either the upper-half foam substrate or the lower-half foam substrate.

5. The method of claim 1, wherein the separating portion is a metal sheet arranged at one or both facing surfaces of the aligned upper-half and lower-half foam substrates.

6. The method of claim 1, wherein the separating portion is a plastic sheet or a silicone sheet arranged at one or both facing surfaces of the aligned upper-half and lower-half foam substrates.

7. The method of claim 1, wherein the pad is a shoe insole.

8. The method of claim 7, wherein the shoe insole has an upper surface provided with a cloth layer or a leather layer, which is adhered to the upper surface of the upper-half foam substrate after Step 5.

9. The method of claim 1, wherein the pad is a seat cushion or a back cushion.

10. The method of claim 1, wherein the pad has a Shore A hardness of 20-60.

11. The method of claim 1, wherein the upper-half foam substrate and the lower-half foam substrate are both made of EVA (Ethylene-vinyl acetate).

* * * * *